United States Patent [19]

Knop et al.

[11] 4,255,761
[45] Mar. 10, 1981

[54] APPARATUS FOR MIXING IMAGE SIGNALS TO OBTAIN A PRINTING MASTER

[75] Inventors: Hans-Georg Knop, Heikendorf; Ingo Hoffrichter, Keil, both of Fed. Rep. of Germany

[73] Assignee: Rudolf Hell GmbH., Kiel, Fed. Rep. of Germany

[21] Appl. No.: 879,596

[22] Filed: Feb. 21, 1978

[51] Int. Cl.³ ............................................. G03F 3/08
[52] U.S. Cl. ........................................ 358/80; 358/75
[58] Field of Search ............... 358/22, 75, 80, 181–183

[56] References Cited

U.S. PATENT DOCUMENTS

| | | | |
|---|---|---|---|
| 2,193,869 | 3/1940 | Goldsmith | 358/183 |
| 2,490,561 | 12/1949 | Ussler | 358/183 |
| 2,799,722 | 7/1957 | Neugebauer | 358/80 |
| 3,153,698 | 10/1964 | Hall et al. | 358/80 |
| 3,260,952 | 7/1966 | Kaye et al. | 358/182 |
| 3,389,220 | 6/1968 | Buzan | 358/164 |
| 3,758,707 | 9/1973 | Keller et al. | 358/80 |
| 3,778,542 | 12/1973 | Hauseman | 358/22 |
| 3,941,925 | 3/1976 | Busch et al. | 358/183 |
| 4,109,278 | 8/1978 | Mendrala | 358/22 |

FOREIGN PATENT DOCUMENTS 1172540  6/1964  Fed. Rep. of Germany ............ 358/75

Primary Examiner—John C. Martin
Attorney, Agent, or Firm—Ernest F. Marmorek

[57] ABSTRACT

In an apparatus and a process for obtaining image signals, and electronically mixing the image signals to generate mixed signals, the steps include modulating one of the image signals with the control signal, amplitude-inverting the control signal, modulating the other image signal with the amplitude-inverted control signal, and adding a modulated image signal so as to obtain the mixed signal. The control signal has prearranged characteristics determining the commencement and at least partly the characteristic of the modulating step.

5 Claims, 10 Drawing Figures

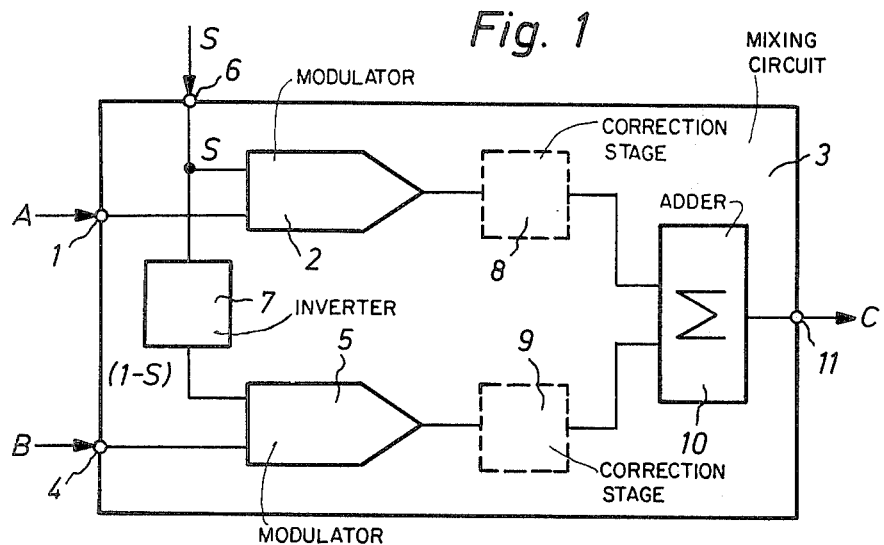
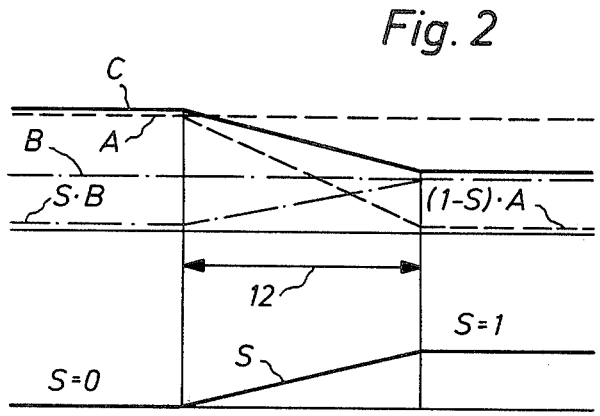
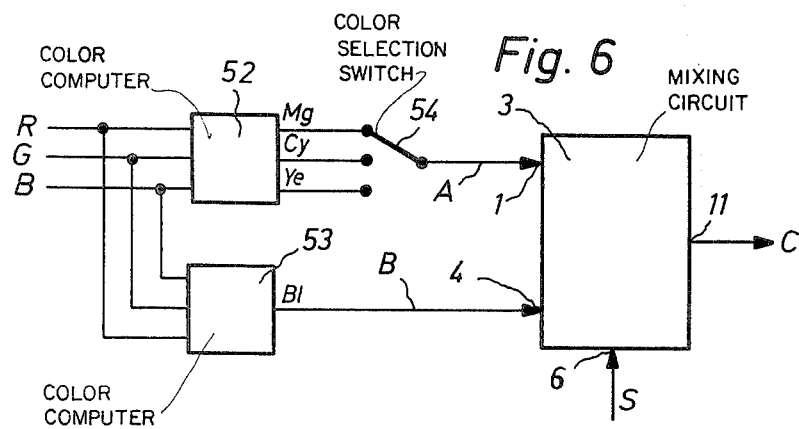

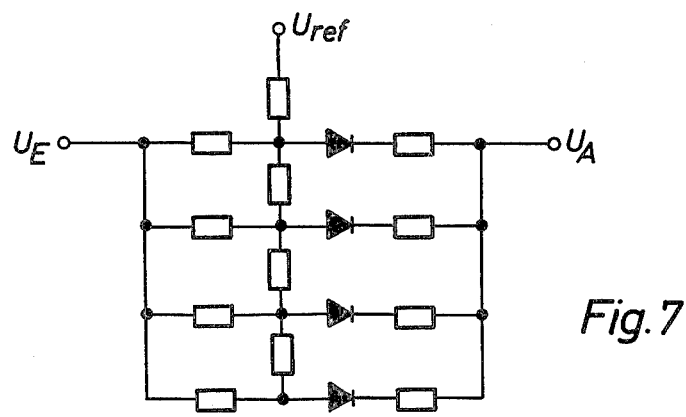
Fig. 7
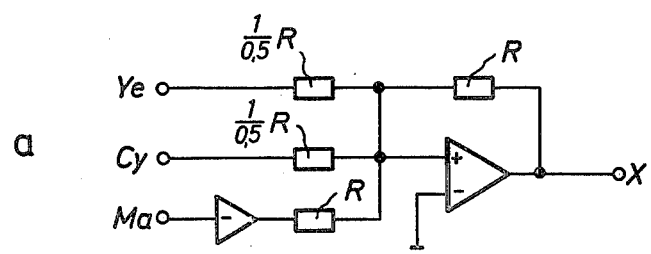
Fig. 8
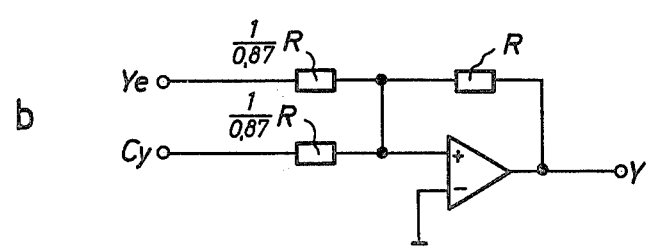
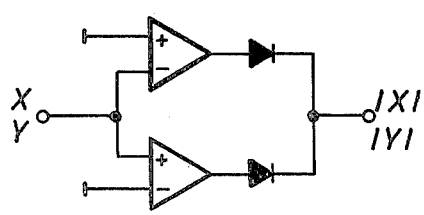
Fig. 9
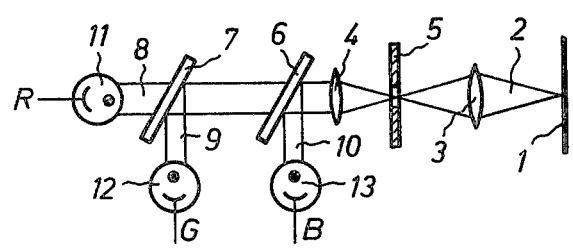
Fig. 10

APPARATUS FOR MIXING IMAGE SIGNALS TO OBTAIN A PRINTING MASTER

BACKGROUND OF THE INVENTION

The present invention relates to a method and an apparatus for mixing of image signals, so as to obtain a printing master, in which an image is photoelectrically scanned, and reproduced in the form of the printing master.

The invention may be applied to color or monochrome scanners, to engraving machines, and to previewer devices, or the like. The signals include primary color-signals, color separation signals, and any form of correction signals.

The requirements which must be met will be illustrated using a color scanner by way of an example.

A color scanner serves to obtain corrected color records for multicolor printing. In order to obtain the color signals, the colored image to be reproduced, which is secured to a rotating scanning drum, is scanned point by point and line by line, by photoelectric scanning means. The color or chrominance signals, which represent the color components of the scanned image points, are fed to a color correction circuit, at the output at which there are available the color component signals determined according to the laws of subtractive color mixing, and if need be, a black separation signal and UCR signal for obtaining the color component signals, "magenta", "cyan", and "yellow", as well as a black separation signal. The color component signals are amplified and fed to a writing lamp, whose brightness is modulated by the associated color component signal. The process for obtaining an UCR-signal is known from U.S. Pat. No. 3,885,244 for example.

Films are secured to a rotatable recording drum, and are illuminated by the writing lamp point by point, and line by line.

The illuminated and developed films yield the desired color components for manufacturing a printing master for multicolored printing.

It will be understood that flat bed devices can be used as well. When using monochrome or color reproduction, it is sometimes required to superimpose two or several images, which is also denoted as "montage". For example, one image may contain an appropriate background, and another image, the foreground or a title. In general, such superimposition relates to showing in the reproduced copy certain image areas, or locally delineated regions of different images, either simultaneously or adjacent one another.

German Patent DT-DS No. 1,172,540, teaches a method in which the images to be combined are secured next to one another on a scanning drum, and are concurrently scanned by two scanners, respectively, to generate image signals. These image signals are alternately supplied to an electronic switch controlled by a control signal, and supplied therefrom to a writing lamp, which records desired combinations of images having relatively strongly delineated contours at the border region of the images.

But as the change of brightness of the writing lamp cannot follow without some inertia the image-signal step-function due to the switching-over process, there are reproduced frequently bright or dark edges, which have a very disturbing effect. In the known method a mask serves to control the switch, which contains the areas, or regions of the image areas adjacent one another, or the image components which blend, or are required to blend, within one another. This mask is scanned by means of a scanning means synchronously with the image, in order to obtain the control signal for the switch-over device, the scanning means including an input-storage device associated with the image to be scanned.

In order to avoid any disturbing edges in the reproduced image, the control mask must be matched very precisely to the image contours, or the image component contours, which in turn necessitates an expensive fabrication of the appropriate mask.

Undesired edges also arise, if the line-to-line scanning or reproduction is not sufficiently accurate with respect to the lines to be transferred.

It is the object of the present invention to avoid these disadvantages; this object is accomplished, if there occurs a continuous change of the image signal within a small zone of a border region of the areas to be scanned.

Smooth transitions are often desirable for editing reasons. Other reproducing requirements include the changing or correction of color or tonal gradations within locally defined regions.

For example, selective corrections may be required only within a certain region, or a region may have to be excluded from selective correction. Frequently, a tonal gradation correction is also required, when a transition occurs in the image from monochrome rendition to colored rendition. These regions can be defined by an appropriately formed color mask, or may be determined by color-selective switching circuits.

According to British Pat. No. 1,400,806, the border regions of the areas are also stored as position data in an X-Y recording system. During reproduction, the actual position and data of the scanner are compared with the storage position data.

In all known methods, the correction signals are switched in a step-wise manner, at the bordering areas.

But a smooth transition of the corrective control is frequently desired at the border regions of respective areas.

It is also desirable to actuate the various control circuits during monochrome or color reproduction within the signal paths of the image signals or color signals; the control then does not become effective during reproduction of the image in a step-wise manner, but acts continuously within a predetermined transition zone.

SUMMARY OF THE INVENTION

One of the principal objects of the invention is therefore a process for obtaining two image signals, and electronically mixing the image signals to generate a mixed signal, the steps including modulating one of the image signals with a control signal, amplitude-inverting the control signal, modulating the other image signal with the amplitude-inverted control signal, and adding the modulated image signals so as to obtain the mixed signal, the control signal having prearranged characteristics determining the commencement and at least partly the characteristic of the modulating step.

It is additionally advantageous if the steps include photoelectrically scanning at least one image to obtain the image signals, and generating a printing master from the mixed signal.

It is additionally preferable to modulate at least one of the image signals multiplicatively. }

It is further advantageous, if the image has at least one prearranged pictorial area to be changed, including a transition zone, and further comprising the step of continuously varying the control signal within a time interval corresponding to said transition zone so as to obtain a continuous charge of at least one of the image signals within said time interval.

It is further advantageous if the image has at least one prearranged pictorial area to be changed, including a transition zone, and wherein a control mask includes at least one corresponding mask area, a circumferential region surrounding said mask area, said mask and said mask area having predetermined image contents, and further comprising the steps of photo-electrically scanning said mask to obtain said control signal and varying said control signal corresponding to said transition zone by evaluating the image contents of said circumferential region.

It is additionally preferable, if the image has at least one prearranged pictorial area to be changed, including a transition zone, and wherein a control mask includes at least one corresponding mask area, said mask and said mask area having predetermined image contents, and further comprising the steps of photo-electrically scanning said image by a first scanning device having a predetermined first aperture, to obtain said image signals photo-electrically scanning said mask by a second scanning device having a predetermined second aperture to obtain said control signal, said second aperture exceeding said first aperture in magnitude to vary said control signal corresponding to said transition zone.

It is also advantageous if the process includes the step of defining said transition zone by the cross-sectional area of said predetermined second aperture. The image preferably includes monochrome components and color components, and further comprising the steps of deriving the control signal from said monochrome components, and from said color components.

It is preferable, if the process includes the steps of generating color separation signals from at least one of the image signals representing a plurality of colors and deriving the control signal from said color separation signals and further comprising the steps of generating two color signals from the color separation signals and adding said color signals to generate the control signal.

It is preferable, if a color is represented by a first set of color separation signals defined by a first set of coordinates, and wherein a second set of color signals is defined by a second set of coordinates, and further comprising the steps of transferring the first set of coordinates into said second set of coordinates, and adding said color signals defined by said second set of coordinates to generate the control signal.

It is advantageous, if the first set of coordinates is denoted by Yellow (Ye), Cyan (Cy), and Magenta (Mg), and wherein the second set of coordinates is denoted by X and Y, and comprising the step of transferring said first set of coordinates into said second set of coordinates by the equation:

$X = 0.50Ye + 0.50Cy - Mg$, and $Y = 0.87Cy - 0.87Ye$.

It is advantageous to further include the step of mixing the two image signals from two images required to yield a composite image.

It is also preferable, that at least one image signal is required to represent certain image characteristics, and further comprising the step of correcting said one image signal, so as to represent said certain image characteristics in a predetermined manner.

It is alternatively advantageous, if each image signal is required to represent predetermined image characteristics, and further comprising the step of correcting each image signal in a different manner, so as to represent the image characteristics in respective first and second predetermined different manners.

It is alternatively advantageous, if at least one image signal is required to represent certain image characteristics, and further comprising the step of correcting said one image signal in a different manner, so as to represent the image characteristics of the image and said at least one prearranged pictorial area in respective first and second predetermined different manners.

It is further preferable, if the process includes the step of generating color separation signals from at least one of the image signals to represent predetermined color characteristics, further comprising the step of color correcting the color separation signals in a different manner, so as to represent the color characteristics of the image and said at least on prearranged pictorial area in respective first and second predetermined different manners.

It is alternatively advantageous, if at least one image signal is required to represent predetermined tone gradation characteristics, and further comprising the step of tone correcting said one image signal in a different manner, so as to represent the tone gradation characteristic of the image and said at least on prearranged pictorial area in respective first and second predetermined different manners.

It is alternatively advantageous, if at least one image signal is required to represent predetermined tone gradation characteristics, and wherein the image includes monochrome components and color components, and further comprising the steps of correcting the one image signal in respective first and second predetermined different manners, and deriving the control signal from said monochrome components and from said color components.

It is alternatively advantageous, if at least one image signal is required to represent predetermined tone gradation characteristics, and wherein the image includes monochrome components and color components, and further comprising the steps of correcting the one modulated image signal, so as to represent the tone gradation characteristics in predetermined manner, and deriving the control signal from said monochrome components and from said color components.

An apparatus for generating an electronically mixed signal from two image signals includes in combination photoelectronic transducer means for scanning two image areas, so as to generate the two signals from the image areas, respectively, a mixer connected to the transducer means for mixing the image signals in a prearranged manner, and control signal generator means for generating a control signal to control the mixing of the image signals in a prearranged manner.

It is advantageous, if a control mask is provided defining a control area corresponding to one of said image areas, said photoelectronic transducer means including a photoelectronic transducer for scanning said control mask so as to generate control signal.

It is further advantageous, if the photoelectronic transducer for scanning the image has a predetermined first aperture and the photoelectronic transducer for scanning the mask has a predetermined second aperture, said second aperture exceeding said first aperture. The image has at least one prearranged pictorial area to be changed, including a transition zone, said transition zone is preferably defined by the cross-sectional area of said second aperture.

It is preferable, if at least one of the image signals represents a plurality of colors, and wherein said control signal generator means includes means for deriving the control signal from the image signal representing said plurality of colors.

It is further advantageous, if the apparatus includes two modulator stages postcoupled to the photoelectronic transducer means, and if the control signal generator means includes an inverter stage for inverting the control signal, the output of the control signal generator and the output of the inverter being fed to the inputs of the modulator stages, respectively.

BRIEF DESCRIPTION OF THE DRAWINGS

The invention will be better understood by means of the accompanying drawings, in which:

FIG. 1 is a first version of a mixing circuit;

FIG. 2 shows a graph of various signals occurring in the mixing circuit;

FIG. 6 is a fourth application example of the mixing circuit;

FIG. 7 is an implementation of the gradation stage;

FIG. 8a is a first version of a color computer;

FIG. 8b is a second version of a color computer; and

FIG. 9 is an implementation example for a signal forming stage.

DESCRIPTION OF THE PREFERRED EMBODIMENTS

Figure 3:
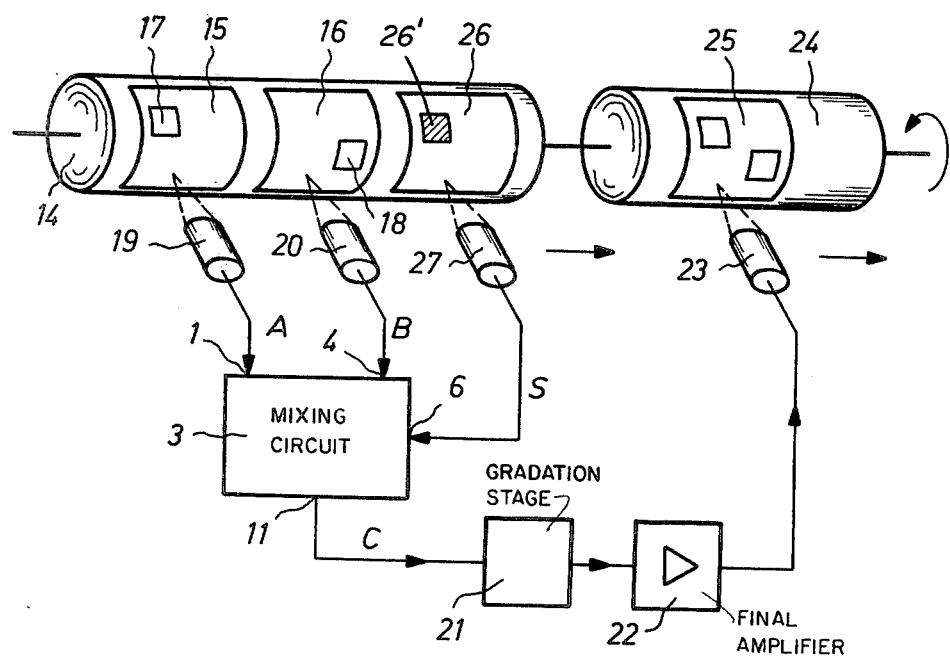
FIG. 3 is a first application example of the mixing circuit.

In carrying the invention into practice, and referring to FIG. 1, which shows a first embodiment of a circuit for mixing two image signals, it will be seen that a first signal A is fed via an input 1 to a modulator 2 of a mixing circuit 3, and a second signal B is fed to an additional modulator 5 via an input 4. The modulator 2 has an additional input 6, which is supplied with a control signal S, and a modulator 5 has an input 4, to which is fed the previously described signal B, and another input through which there is supplied the inverted control signal, namely (1-S), which is in turn obtained from an inverter 7, to the input of which is fed the control signal S. The control signal S determines the commencement of the modulation, and the mixing characteristics.

The modulators 2 and 5 are preferably linear multiplication stages.

The inverter 7 is an operational amplifier using feedback, and has an inverting input, to which there is supplied the control signal S. A constant voltage is added to the amplitude-inverted control signal S, and is so chosen that the output signal of the inverter 7 is equal to zero, when the control signal S is maximum.

The output of the modulator 2, and of the modulator 5, are coupled, if necessary, via respective correction stages 8 and 9, to an adder 10. At the output 11 of the mixing circuit 3, which is also the output of the adder 10, there appears the mixed signal C, which is given by:

$$C = S \times B + (1-S) \times A.$$

The correction stages are in general used for color or tonal corrections of the signals within the signal paths of the signals A, B, or C.

In a preferred version of the mixing circuit 3, the correction stages 8 and 9 are immediately postcoupled to the modulators 2 and 5, respectively, and the adder 10 is implemented as a potentiometer having a variable center tap. This permits an independent balancing of the mixing circuit output, independent of the control signal S, the balancing referring to the output signals of the modulators 2 and 5.

It is advantageous if the control signal S is the signal derived from a mask, a color signal, or a signal derived from the color signal.

FIG. 2 shows an amplitude-versus time diagram of the signals A and B, as well as of the combined signal C, within a transition zone 12, which is delineated by the values S=0, and S=1 of the control signal S, and whose amplitude excursion can be changed by the shape of the control signal S.

If the control signal S indicated within the transition zone 12 increases continuously, then the amplitude versus time diagram of the signals A and B is also continuous, and a smooth change from signal A to signal B occurs within the transition zone 12.

If the signals A and B are of equal magnitude, then the mixed signal C is independent of the control signal S, and directly proportional to the signal A, or the signal B.

In FIG. 2, the control signal S is shown as linearly increasing within the transition zone 12. It will be understood that the control signal S may, of course, also have any other shape.

FIG. 3 shows an exemplary embodiment of the mixing circuit, when scanning image areas of two different images by means of a monochrome scanner, and combining these areas on a single image.

On a rotatable scanning drum 14, there are disposed two images 15 and 16, having respective image areas 17 and 18, which are to be combined during reproduction. In order to generate the image signals A and B, the images 15 and 16 are scanned by photo-electric scanners 19 and 20, respectively, which move in a parallel manner along the scanning drum 14, and scan the respective images 15 and 16, point by point, and line by line. The image signals A and B are fed to the inputs 1 and 4 of the mixing circuit 3. The mixed image signal C, which appears at the output 11 of the mixing circuit 3, is supplied to a gradation stage 21, in which there takes place a preselected gradation depending on the printing method, the printing type, and the printing block or master.

The gradation stage 21 of FIG. 3, is typically a function generator. A function generator of this type is shown in FIG. 7. A selected function is represented by a multiplicity of contiguous linear segments, the slope of each segment and the segment transition points being determined by the voltage supplied to diodes 54, and by voltage dividers, including resistors 55, 56, and 57, resistors 67 being postcoupled to respective diodes 54.

The image signal C, modified when passing the gradation stage 21, and amplified in the final amplifier 22, modulates the brightness of a recording means 23, implemented, for example, by a writing lamp, which moves along in a parallel manner along a second rotatable drum 24, a film 25, which is a recording carrier, being secured to the rotatable drum 24.

The recording means 23 illuminates, and thus transfers the image areas 17 and 18, which are to be combined from the images 15 and 16, point by point, and line by line, onto the film 25, by an appropriate variation of illumination.

A control mask 26, which contains at least one of the image areas 17 and 18 of the images 15 and 16, in the form of a control mask area 26' having a black background on white, or white background on black, is secured to the rotatable drum 14. The control mask 26, which may also be disposed on a separate rotatable drum, is scanned synchronously with the images 15 and 16, by a further scanner 27, point by point, and line by line, in order to obtain the control signal S.

The scanner 27, which is connected to the input 6 of the mixing circuit 3, supplies, according to the monochrome input of the control mask 26, a binary control signal (S=0, or S=1), which causes either the image signal A, or the image signal B, to be transmitted to the recording means 23, via the mixing circuit 3.

According to the present invention, the scanning of the control mask is accomplished simultaneously with the evaluation of a region surrounding the image area being scanned. The evaluation of the region surrounding the image area which is being scanned may also be accomplished by deriving or calculating information concerning the region surrounding the image area to be scanned from image points or data which are stored, or by scanning of the mask through a lens system which is out of focus, the lens system having an aperture of a dimension exceeding the aperture of the focusing system of the scanning means 19 and 20. For example, when the control mask 26 is scanned by means of a focal system having an aperture, so that the focused image is out of focus, the control signal S, which is normally a binary signal, will change continuously in the transition zone, along the contours of the control mask, so that a smooth transition zone is achieved along the contours of the image areas or components being scanned. The width of the transition zone, which corresponds to an amplitude excursion of the corresponding signal, is advantageously determined by the diameter of the aperture of the focusing system associated with the control mask.

Figure 4:
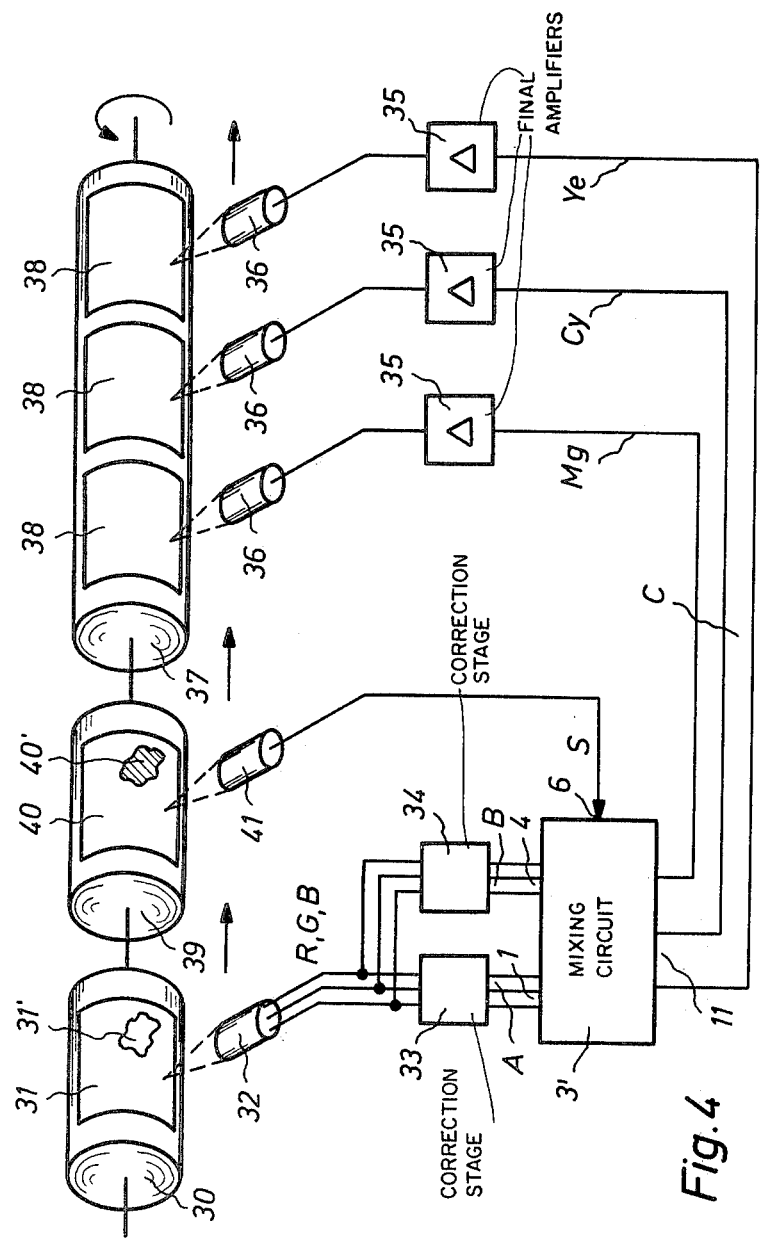
FIG. 4 is a second application example of the mixing circuit.

FIG. 4 illustrates a second implementation of the mixing circuit of a color scanner.

In a so-called partial correction of an image, it is advisable, for example, to correct predetermined regions of an image characterized by their position or special properties in a particular manner. Such a correction should relate to the color or tonal value, or gradation of the image of each area. Frequently, it is not desirable to change the correction suddenly at the borders of the respective regions, but it is much more advantageous to achieve such a correction gradually, which is accomplished by an appropriate mixture of differently corrected color signals.

A color image 31 is secured to a rotatable scanning drum 30, which is scanned by a scanning means 32, point by point and line by line, the scanning means 32 being movable in parallel along the scanning drum 30.

A scanning beam is divided in the scanning means 32 into three scanning rays, each scanning ray being associated with a respective color channel. Color filters and photoelectric transducers are associated with respective color channels also, so as to obtain three color signals, namely red (R), green (G), and blue (B). The three color signals represent the colors of the scanned image point. The color signals are fed simultaneously to two correction stages 33 and 34, one correction stage serving to correct the entire image 31, and the other correction stage serving to correct a partial image 31'.

The correction stages 33 and 34 are color computers, known per se, which change the measured color signals red, green, and blue according to the principles of subtractive color mixing into corrected color signals magenta, cyan, and yellow.

Color computers of this type are described, for example, in U.S. Pat. No. 3,885,244. At the output of the correction stages 33 and 34, there are available two differently corrected color signals A and B, respectively, for supplying the appropriate colors of the image signal. The outputs of the correction stages 33 and 34 are connected to the inputs 1 and 4, respectively, of the mixing circuit 3', which differs from the mixing circuit 3 shown in FIG. 1, by having a greater number of inputs for the color components of the image signal.

The three color component signals C (Mg, Cy, Ye) are supplied via the output 6 of the mixing circuit 3' and via respective final amplifiers 35, to a respective writing lamp 36, the writing lamp 36 serving as the recording means. Respective films 38 are attached to a rotatable drum 37. The writing lamps 36, whose brightness is modulated by the respective associated color component signal, move jointly axially along the rotatable drum 37, and illuminate the films 38, point by point, and line by line, respectively.

The illuminated and subsequently developed films 38 yield the desired color components magenta, yellow and cyan.

A masking drum 39, rotatable synchronously with the scanning drum 30, has disposed thereon a mask 40, which includes a region 40', having different corrective information thereon as control information. A scanner 41 having an aperture so as to also be able to be directed towards a region surrounding the region 40', scans the mask 40, and generates the control signal S, which is supplied to the input 6 of the mixing circuit 3'.

Figure 5:
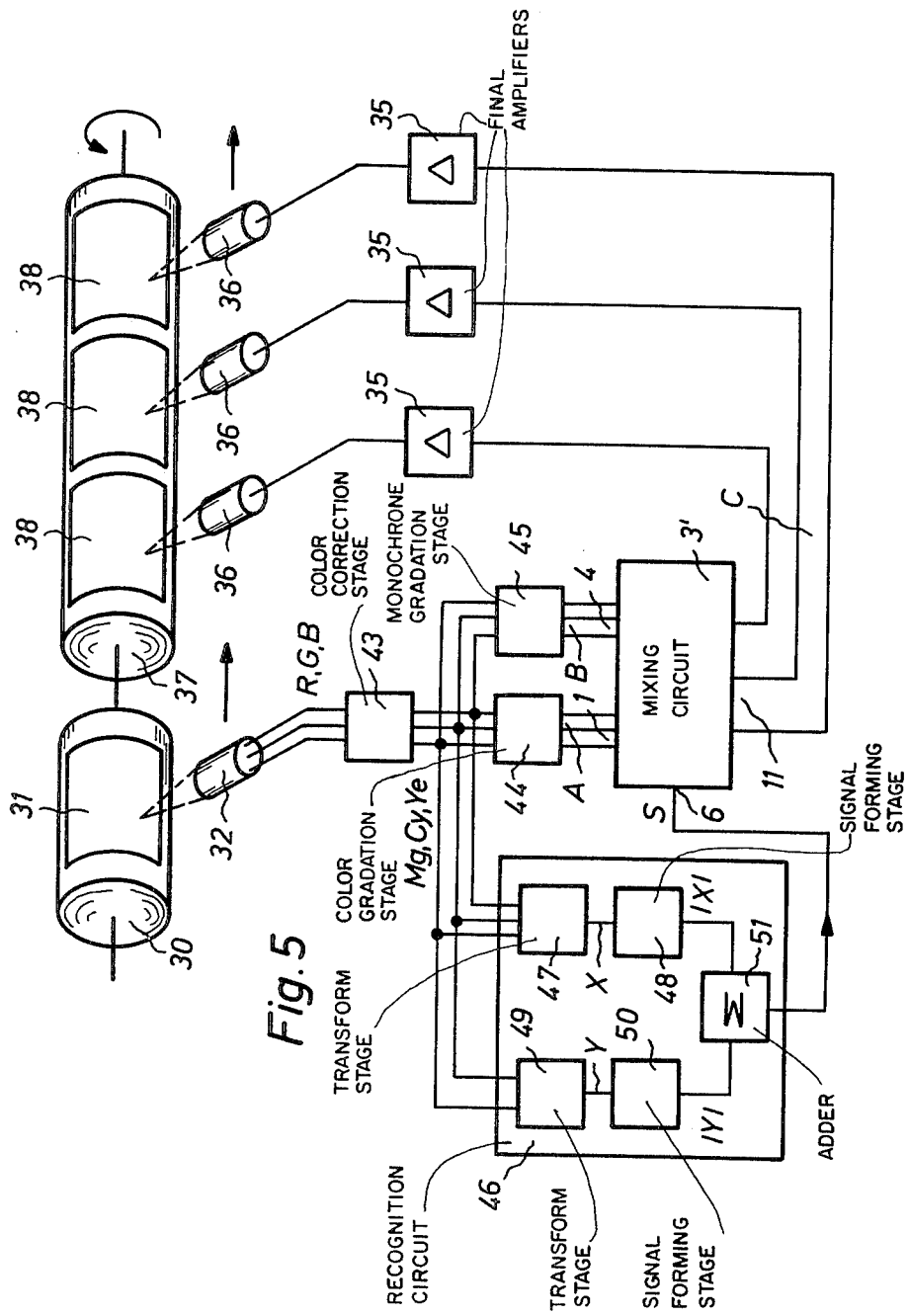
FIG. 5 is a third application example of the mixing circuit.

FIG. 5 shows a third implementation example of the mixing circuit.

During the reproduction of a color image, it is frequently required to change the gradation of the image in dependence on the monochrome or color characteristics of the image.

The colors involved are then modified either according to a predetermined color gradation, or according to a monochrome gradation. In this case, the gradation should not be changed suddenly, but rather continuously in dependence of the image transition from monochrome to color, or vice versa.

By photoelectrically scanning the image 31 by means of the scanning means 32, the color signals red, green, and blue obtained thereby are supplied to a color correction stage 43 for forming the color component signals magenta, cyan, and yellow, the color correction stage 43 being similar to the color correction stages 33 and 34.

These color component signals are fed simultaneously to a color gradation stage 44, and to a monochrome gradation stage 45. The gradation stages 44 and 45 are connected to the inputs 1 and 4 of the mixing circuits 3', respectively, and are similar in design to the gradation stage 21.

The output signals C of the mixing circuit 3' are fed via respective final amplifiers 35 to the writing lamps 36, which illuminate the films 38. According to the present invention, the control signal S for the mixing circuit 3' is obtained by means of a recognition means 46 in the color component signals.

The recognition signal 46 consists of a first transform stage 47, in which there is formed a signal X from the color component signals magenta, cyan, and yellow, according to the transformation equation:

$$X = 0.5Ye. + 5Cy - Mg.$$

In a postcoupled signal-forming stage 48, the signal /X/, is generated, the signal /X/ being the absolute magnitude of the signal X. In a second transform stage 49, a signal Y is generated from the color signals Cy and Ye, according to the transformation equation:

$$Y = 0.87Cy - 0.87Ye.$$

A postcoupled signal-forming stage 50 generates the signal /Y/, the signal /Y/ being equal to the absolute magnitude of the signal Y.

FIG. 9 shows a preferred implementation of the signal-forming stage 48 or 50; it consists of two operational amplifiers 65, to which there are postcoupled dividers 66, having a common output.

The signals /X/ and /Y/ are added in an adder stage 51 to yield the control signal S, which is supplied to the input 6 of the mixing circuit 35.

FIGS. 8a and 8b show implementation examples for transform stages 47 and 49, respectively, in which the signals X and Y are generated from the color components yellow, cyan, and magenta. FIG. 8a includes, for example, an amplifier 60 and a second amplifier 61, the amplifier 61 being a differential amplifier, the input to the differential amplifier 61 being a combined signal of cyan and magenta, the color yellow, appropriately attenuated, being added at the output of amplifier 61 to yield the signal X.

Resistors 58 and 59 are apportioned to yield the signal X in accordance with the previous equations postulated for the signals.

Similarly, the signal Y is generated by means of weighted resistors 62 and 63, in conjunction with a differential amplifier 64, as illustrated in FIG. 8b. The resistors 62 and 63 are chosen in accordance with the transformation equations previously given for the signal Y.

If the image 31 contains color components, then the control signal S has a maximum value. If, however, a monochrome signal is sensed, then the control signal S is equal to zero. If there is a continuous transition from color to monochrome, then the control signal S shows a continuous change. The control signal S may advantageously be also a monochrome signal, a UCR signal, or a difference signal formed from the maximal and minimal color signals.

In an advantageous embodiment, according to the invention, the gradation stages 44 and 45, as has been explained with the aid of FIG. 1, may also be connected downstream of the modulators 2 and 5, respectively, in the mixing circuit 3'.

In a further development of the invention, the mixing circuit 3' is formed by a balance control circuit, so that the input signals A and B may be balanced by means of the control signal S.

FIG. 6 shows the application of a mixing circuit as a balance regulator between color and monochrome signals.

The color signals red, green, and blue, obtained by scanning of an image, are supplied to a first color computer 52 to obtain the colors magenta, cyan, and yellow, and to a second color computer 53, for obtaining the monochrome components. The color computers 52 and 53 are similar to the correction stages 33 and 34 of FIG. 4. One of the color signals, for example, signal A, is fed via a color selection switch 54 to the input 1 of the mixing circuit 3', whose input 4 receives a monochrome signal B.

The control signal S may be a color component signal, or the UCR signal, but it may also be derived from a control mask, a color, or a color component of the image.

The input signals A and B of the mixing circuit 3' may also be two color signals. In this case, the mixing circuit 3 serves to adjust the balance between the monochrome and the color components.

The mixing circuit 3', may, however, also receive the monochrome correction signals as an input, so as to adjust the magnitude of the correction signals. The output signal C of the mixing circuit 3' is then added to a main channel as a correction signal.

We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. In a process of changing the gradation of an image including a plurality of colors for effecting a predetermined change in the image,
   the steps comprising:
   photoelectrically scanning said image to obtain an image signal, said image signal including a predetermined ratio of chrominance components to luminance components,
   generating a control signal in dependence of said predetermined ratio,
   allotting to said control signal a first level when said chrominance components are present in a predetermined amount in said image signal, a second level when said luminance components are present in a prearranged amount in said image signal, whereby, when said ratio of chrominance-to-luminance components in said image signal is gradually changing, a gradually changing level between said first and second levels is obtained, and
   modulating the image signal with the control signal, and generating a printing master from the modulated image signal.

2. A process according to claim 1, further comprising the steps of
   generating a first set of three color separation signals containing said luminance and chrominance components,
   transforming said first set of three color separation signals into a second set of two color signals, said second set of color signals containing only chrominance components, and
   adding said two color signals so as to obtain said control signal.

3. A process according to claim 2, wherein said first set of color separation signals includes the colors Magenta (Mg), Cyan (Cy), and Yellow (Ye), and wherein said second set of color signals includes the colors X and Y, and wherein said transforming step is carried out according to the equation:

$$X = 0.5Ye + 0.5Cy - Mg,$$

and $$Y = 0.87Cy - 0.87Ye.$$

4. A process of electronically mixing image signals, in which at least one image including non color components and color components is scanned opto-electronically to obtain image signals representing a plurality of colors, and is reproduced as a printing form, and wherein one of the image signals to be mixed is modulated with a control signal and the other image signal is modulated with the amplitude-inverted control signal, and wherein the modulated signals are added so as to obtain a mixed image signal, the process comprising the steps of:

determining at least one image area to be changed in said image with a steady (gradual; soft) change-over between said image and said image area within a transition zone surrounding said one image area, generating a first set of color separation signals (Mg; Cy; Ye) from the image signals, said color separation signals representing the coordinates of a color in the printing color space (Mg; Cy; Ye)

transforming said first set of color separation signals (Mg; Cy; Ye) into a second set of color signals (X; Y) representing the chrominance-coordinates of said color in the chrominance-luminance-color space, adding the amounts of said second set of color signals to obtain the control signal marking said non color components and said color components, and deriving said control signal from one of said image signals, wherein said control signal has a first level when scanning said image, a second level when scanning the image area and a steady change-over between the levels when scanning said transition zone, representing a change in color; and wherein the change-over time of the control signal corresponds to the transition zone and its change-over shape defines the mixing characteristic within said transition zone.

5. A process comprising the steps of electronically mixing image signals, in which at least one image including non color components and color components is scanned opto-electronically to obtain image signals representing a plurality of colors, and is reproduced as a printing form, and wherein one of the image signals to be mixed is modulated with a control signal and the other image signal is modulated with the amplitude-inverted control signal, and wherein the modulated signals are added so as to obtain a mixed image signal, the process comprising the steps of:

determining at least one image area to be changed in said image with a steady (gradual; soft) change-over between said image and said image area within a transition zone surrounding said one image area, generating a first set of color separation signals (Mg; Cy; Ye) from the image signals, said color separation signals representing the coordinates of a color in the printing color space (Mg; Cy; Ye)

transforming said first set of color separation signals (Mg; Cy; Ye) into a second set of color signals (X; Y) representing the chrominance-coordinates of said color in the chrominance-luminance-color space by the equation:

$$X = 0.50Ye + 0.50Cy - Mg,$$

and $$Y = 0.87Cy - 0.87Ye,$$

adding the amounts of said second set of color signals to obtain the control signal marking said non color components and said color components, and deriving said control signal from one of said image signals, wherein said control signal has a first level when scanning said image, a second level when scanning the image area and a steady change-over between the levels when scanning said transition zone, representing a change in color; and wherein the change-over time of the control signal corresponds to the transition zone and its change-over shape defines the mixing characteristic within said transition zone.

* * * * *